Patented Apr. 26, 1932

1,855,393

UNITED STATES PATENT OFFICE

WILHELM GLUUD, OF DORTMUND-EVING, GERMANY

PROCESS FOR MAKING SODIUM NITRATE

No Drawing. Application filed October 31, 1928, Serial No. 316,360, and in Germany November 3, 1927.

My invention relates to fertilizers and more especially to means whereby ammonium nitrate can be converted into a fertilizer.

Until the last years ammonium nitrate was considered unfit for use as a fertilizer in view of its hydroscopicity and its explosive properties. It has already been suggested to mix the salt with other salts such as for instance ammonium sulfate in order to reduce its hydroscopicity and to avoid the danger of explosion and it has further been suggested to bring it into reaction with other salts so as to convert same into some other nitrate.

I have found that ammonium nitrate can be rendered suitable for fertilizing purposes in a particularly simple and effective manner if it is made to react with sodium bicarbonate, being thereby converted into sodium nitrate according to the equation:

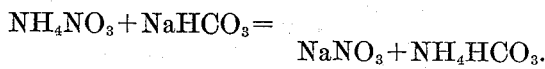
$$NH_4NO_3 + NaHCO_3 = NaNO_3 + NH_4HCO_3.$$

According to my invention I cause the two salts to act upon each other in dry or slightly moist condition and at an elevated temperature. If this is done, the ammonium bicarbonate which forms in the reaction, is volatilized. The reaction takes place quickly and in a quantitative manner, the continuous removal of one of the two products from the reaction phase favouring extremely the formation of sodium nitrate.

However, also apart from the smooth conversion into sodium nitrate, the present invention offers the particular advantage that the process can easily be combined with the well known ammonia-soda process, the ammonium nitrate being acted upon by the sodium bicarbonate resulting in the soda process, while the ammonium bicarbonate resulting in the reaction between ammonium nitrate and sodium bicarbonate can be used as a starting product in the soda process.

I have found that the new process can be combined with particular advantage with the process for manufacturing sodium bicarbonate and ammonium chloride described in the co-pending application for patent of the United States, Serial No. 1628, filed January 10, 1925 now Patent No. 1,710,636, by Wilhelm Gluud and Bernhard Löpmann. For in this latter process, which substantially consists in acting first with carbonic acid and ammonia and thereafter with sodium chloride on a solution containing besides the bicarbonates of sodium and ammonium a readily soluble auxiliary salt of one of the two bases (sodium and ammonium) and of an acid other than hydrochloric and carbonic acid, the use of solid and dry ammonium bicarbonate has proved particularly useful in view of the necessity of maintaining a predetermined concentration of the salt solution.

Example 160 parts by weight of ammonium nitrate and 164 parts of sodium bicarbonate are mixed and the mixture is heated in a closed vessel to about 100–130° C. The ammonium nitrate is completely converted into pure sodium nitrate of which 170 parts are recovered which can be put to use directly for fertilizing purposes while the other reaction product (ammonium bicarbonate) is wholly volatilized and is recovered by condensation in the form of solid salt, 158 grams being thus recovered. This salt is now introduced into a 10 per cent solution of sodium sulfate, saturated with ammonium chloride and sodium chloride and to the solution which is heated to 40° C. are then added in alternating doses further quantities of ammonium bicarbonate and sodium chloride, until the ion concentration required for the ammonia-soda process according to the co-pending patent application is reached. While in the above description of the process the ammonium bicarbonate was stated to be added in the form of a solid, it might obviously also be introduced into the solution in the form of the vapor developed during the reaction between ammonium nitrate and sodium bicarbonate. In any case about 156 grams sodium bicarbonate will separate out, which are filtered and rinsed in the usual manner, the wash water containing sodium bicarbonate being added to the liquor to keep its volume constant. The sodium bicarbonate so recovered can be used in another operation for the decomposition of ammonium nitrate as above described. The filtrate from the sodium bicarbonate is cooled down to about 30° C. and stirred during about one hour with 117 grams finally ground sodium chloride, whereupon about 100 grams ammonium chloride are separated out, which are filtered in the usual manner. This ammonium chloride can be mixed with the sodium nitrate obtained according to my invention to form a mixed fertilizer.

The reaction between the ammonium nitrate and sodium bicarbonate can be expedited by conducting air or steam through the reaction vessel.

If the sodium bicarbonate is replaced by a potassium salt, the ammonium nitrate can be converted into potassium nitrate in the same manner.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The process of manufacturing sodium nitrate from ammonium nitrate which comprises reacting upon said ammonium nitrate with sodium bicarbonate to form sodium nitrate and ammonium bicarbonate, removing said ammonium bicarbonate, treating it to reconvert it into sodium bicarbonate and using the sodium bicarbonate so obtained for the treatment of further amounts of ammonium nitrate.

2. The process of manufacturing sodium nitrate from ammonium nitrate which comprises treating ammonium nitrate with sodium bicarbonate at an elevated temperature and in a current of an inert gas.

3. The process of manufacturing sodium nitrate from ammonium nitrate which comprises treating ammonium nitrate with sodium bicarbonate at an elevated temperature and in a current of steam.

4. The process of manufacturing sodium nitrate from ammonium nitrate which comprises treating ammonium nitrate with sodium bicarbonate at a temperature of from 100° C. to 130° C. in a current of an inert gas.

5. The process of manufacturing sodium nitrate from ammonium nitrate which comprises treating ammonium nitrate with sodium bicarbonate at a temperature of from 100° C. to 130° C. in a current of steam.

6. The process of manufacturing sodium nitrate from ammonium nitrate which comprises reacting upon said ammonium nitrate with sodium bicarbonate to form sodium nitrate and ammonium bicarbonate, removing said ammonium bicarbonate, introducing it into a solution saturated with respect to sodium chloride, ammonium chloride and sodium bicarbonate and containing a readily soluble auxiliary salt to cause the precipitation of sodium bicarbonate, recovering the precipitated sodium bicarbonate therefrom and using it for the treatment of further amounts of sodium nitrate.

In testimony whereof I affix my signature.

WILHELM GLUUD.